(12) United States Patent
Katsuyama et al.

(10) Patent No.: US 10,346,910 B2
(45) Date of Patent: Jul. 9, 2019

(54) SYSTEMS AND METHODS FOR PROVIDING UP-TO-DATE INFORMATION FOR TRANSACTIONS

(71) Applicant: IEX Group, Inc., New York, NY (US)

(72) Inventors: Bradley Katsuyama, New York, NY (US); John Schwall, Staten Island, NY (US); Robert Park, New York, NY (US); Ronan Ryan, Morristown, NJ (US); Benjamin Aisen, New York, NY (US); Daniel Aisen, New York, NY (US); Donald Bollerman, Yonkers, NY (US); Francis Chung, New York, NY (US); Stanley Feldman, New York, NY (US); Tara McKee, New York, NY (US); Bilie Zhao, East Hanover, NJ (US); James Michael Cape, New York, NY (US); David Lauer, Collingswood, NJ (US); Allen Zhang, Princeton, NJ (US); Blair Livingston, Toronto (CA); Matthew Norbert Trudeau, Brooklyn, NY (US); Zoran Perkov, Brooklyn, NY (US)

(73) Assignee: IEX GROUP, INC., New York, NY (US)

(*) Notice: Subject to any disclaimer, the term of this patent is extended or adjusted under 35 U.S.C. 154(b) by 819 days.

(21) Appl. No.: 14/688,463

(22) Filed: Apr. 16, 2015

(65) Prior Publication Data
US 2015/0302441 A1    Oct. 22, 2015

Related U.S. Application Data

(60) Provisional application No. 61/980,421, filed on Apr. 16, 2014.

(51) Int. Cl.
*G06Q 40/04* (2012.01)
*G06Q 30/02* (2012.01)
*G06Q 40/06* (2012.01)

(52) U.S. Cl.
CPC ......... *G06Q 40/04* (2013.01); *G06Q 30/0206* (2013.01); *G06Q 40/06* (2013.01)

(58) Field of Classification Search
None
See application file for complete search history.

(56) References Cited

U.S. PATENT DOCUMENTS

| 4,736,294 A | 4/1988 | Gill et al. |
| 5,339,392 A | 8/1994 | Risberg et al. |

(Continued)

FOREIGN PATENT DOCUMENTS

| AU | 2010330629 B2 | 2/2012 |
| AU | 2016200212 A1 | 2/2016 |

(Continued)

OTHER PUBLICATIONS

Bhupathi, Tara, Technology Latest Market Manipulator-High Frequency Trading the Strategies, Tools, Risks, and Responses, NCJL and Tech, 11, 377, 2009 http://scholarship.law.unc.edu/cgi/viewcontent.cgi?article=1168&context=ncjolt http://heinonline.org/HOL/Page?handle=hein.journals/ncjl11&div=18&g_sent=1&casa_token=.*

(Continued)

*Primary Examiner* — Octavian Rotaru
(74) *Attorney, Agent, or Firm* — Goodwin Procter LLP (57) ABSTRACT

In a system for executing transaction requests, a received request for a transaction in an item is delayed prior to matching that request with another request for transaction in that item by a delay based on a communication delay and/or a processing delay. The communication delay represents the time required to receive updated information about the item (Continued)

US 10,346,910 B2

Page 2 and the processing delay represents the time required to compute an updated item price using the received updated information.

20 Claims, 3 Drawing Sheets (56) References Cited

U.S. PATENT DOCUMENTS

| | | | |
|---|---|---|---|
| 6,618,707 B1 * | 9/2003 | Gary | G06Q 40/00 705/36 R |
| 6,681,232 B1 | 1/2004 | Sistanizadeh et al. | |
| 6,970,924 B1 | 11/2005 | Chu et al. | |
| 6,996,540 B1 | 2/2006 | May | |
| 7,552,077 B1 | 6/2009 | Schluetter et al. | |
| 7,873,561 B1 | 1/2011 | Adcock et al. | |
| 8,090,637 B2 | 1/2012 | Schluetter et al. | |
| 8,112,347 B2 * | 2/2012 | Farrell | G06Q 40/04 705/37 |
| 8,306,901 B1 | 11/2012 | Gastineau et al. | |
| 8,315,940 B2 | 11/2012 | Winbom et al. | |
| 8,489,747 B2 | 7/2013 | Aisen et al. | |
| 8,589,260 B2 | 11/2013 | Chambers et al. | |
| 8,768,805 B2 | 7/2014 | Taylor et al. | |
| 8,984,137 B2 | 3/2015 | Aisen et al. | |
| 9,082,119 B2 | 7/2015 | Ortiz et al. | |
| 9,727,602 B2 * | 8/2017 | Djurdjevic | G06F 17/30371 |
| 9,922,436 B2 | 3/2018 | Iannaccone et al. | |
| 9,928,548 B2 | 3/2018 | Schmidt et al. | |
| 9,940,670 B2 | 4/2018 | Aisen et al. | |
| 9,959,572 B2 | 5/2018 | Iannaccone et al. | |
| 2002/0156721 A1 | 10/2002 | Lyback et al. | |
| 2003/0177086 A1 | 9/2003 | Gomber et al. | |
| 2003/0231741 A1 * | 12/2003 | Rancu | H04M 3/303 379/9 |
| 2004/0024689 A1 | 2/2004 | Zhou | |
| 2004/0059666 A1 * | 3/2004 | Waelbroeck | G06Q 40/04 705/37 |
| 2005/0075963 A1 * | 4/2005 | Balabon | G06Q 40/00 705/36 R |
| 2005/0131802 A1 * | 6/2005 | Glodjo | G06Q 30/08 705/37 |
| 2005/0137961 A1 * | 6/2005 | Brann | G06Q 40/04 705/37 |
| 2005/0234805 A1 * | 10/2005 | Robertson | G06Q 30/08 705/37 |
| 2006/0106713 A1 | 5/2006 | Tilly et al. | |
| 2006/0259397 A1 * | 11/2006 | Schluetter | G06Q 20/10 705/37 |
| 2006/0259417 A1 * | 11/2006 | Marynowski | G06Q 40/025 705/37 |
| 2008/0172321 A1 * | 7/2008 | Bartko | G06Q 40/00 705/37 |
| 2009/0024498 A1 | 1/2009 | Berezuk et al. | |
| 2009/0089199 A1 * | 4/2009 | Waelbroeck | G06Q 10/0637 705/37 |
| 2009/0099952 A1 * | 4/2009 | Wahlberg | G06Q 40/00 705/37 |
| 2009/0182683 A1 | 7/2009 | Taylor et al. | |
| 2010/0088216 A1 * | 4/2010 | Czupek | G06Q 10/087 705/37 |
| 2010/0094743 A1 | 4/2010 | Robertson et al. | |
| 2010/0332650 A1 | 12/2010 | Aisen et al. | |
| 2011/0178913 A1 | 7/2011 | Smith | |
| 2012/0022999 A1 | 1/2012 | Bartko et al. | |
| 2012/0042080 A1 * | 2/2012 | Aisen | H04L 43/0852 709/226 |
| 2012/0166327 A1 | 6/2012 | Amicangioli | |
| 2012/0296796 A1 * | 11/2012 | Smith | G06Q 40/025 705/37 |
| 2012/0323757 A1 * | 12/2012 | Monroe | G06O 40/04 705/37 |
| 2013/0013487 A1 * | 1/2013 | Sellberg | G06Q 40/04 705/37 |
| 2013/0179319 A1 * | 7/2013 | Barker | G06Q 40/04 705/37 |
| 2013/0204760 A1 * | 8/2013 | Decker | G06Q 40/04 705/37 |
| 2013/0246239 A1 * | 9/2013 | Cooke | G06Q 40/04 705/37 |
| 2013/0297478 A1 * | 11/2013 | Mannix | G06Q 40/04 705/37 |
| 2013/0325684 A1 * | 12/2013 | Vogler | G06Q 40/04 705/37 |
| 2014/0019323 A1 | 1/2014 | Blake | |
| 2014/0081822 A1 | 3/2014 | Cushing | |
| 2014/0095409 A1 * | 4/2014 | Bohman | G06Q 40/06 705/36 R |
| 2014/0143118 A1 | 5/2014 | Schwarz et al. | |
| 2014/0172662 A1 * | 6/2014 | Weiss | G06Q 40/04 705/37 |
| 2014/0279342 A1 * | 9/2014 | Maynard | G06Q 40/04 705/37 |
| 2014/0279552 A1 | 9/2014 | Ortiz et al. | |
| 2015/0066727 A1 * | 3/2015 | Wepsic | G06Q 40/04 705/37 |
| 2015/0073970 A1 * | 3/2015 | Merold | G06Q 40/04 705/37 |
| 2015/0081508 A1 * | 3/2015 | Schwall | G06Q 40/04 705/37 |
| 2015/0127519 A1 * | 5/2015 | Melton | G06Q 40/04 705/37 |
| 2015/0235212 A1 | 8/2015 | Ortiz et al. | |
| 2015/0261625 A1 * | 9/2015 | Cape | G06F 11/1658 714/19 |
| 2015/0302441 A1 * | 10/2015 | Katsuyama | G06Q 30/0206 705/7.35 |
| 2016/0019536 A1 | 1/2016 | Ortiz et al. | |
| 2016/0055581 A1 * | 2/2016 | Katsuyama | G06Q 40/04 705/37 |
| 2016/0078537 A1 * | 3/2016 | Katsuyama | G06Q 40/04 705/37 |
| 2016/0078538 A1 * | 3/2016 | Katsuyama | G06Q 40/04 705/37 |
| 2016/0104155 A1 | 4/2016 | McGaugh et al. | |
| 2016/0104242 A1 * | 4/2016 | Melton | G06Q 40/04 705/37 |
| 2016/0173364 A1 | 6/2016 | Pitio et al. | |
| 2016/0182330 A1 | 6/2016 | Iannaccone et al. | |
| 2016/0189260 A1 | 6/2016 | Nagla | |
| 2016/0205174 A1 | 7/2016 | Pitio et al. | |
| 2016/0210626 A1 | 7/2016 | Ortiz et al. | |
| 2016/0260173 A1 | 9/2016 | Aisen et al. | |
| 2016/0267082 A1 | 9/2016 | Wong et al. | |
| 2016/0277348 A1 | 9/2016 | Pitio | |
| 2017/0017958 A1 | 1/2017 | Scott et al. | |
| 2017/0039648 A1 | 2/2017 | Aisen et al. | |
| 2017/0097973 A1 | 4/2017 | Iannaccone et al. | |
| 2017/0124494 A1 | 5/2017 | Hristoskov et al. | |
| 2017/0161735 A1 | 6/2017 | Ortiz et al. | |
| 2017/0186085 A1 | 6/2017 | Nagla | |
| 2017/0249622 A1 | 8/2017 | Ortiz et al. | |
| 2017/0279736 A1 | 9/2017 | Pitio et al. | |
| 2017/0330181 A1 | 11/2017 | Ortiz | |
| 2018/0018723 A1 | 1/2018 | Nagla et al. | |
| 2018/0047065 A1 | 2/2018 | Wildberger | |
| 2018/0054363 A1 | 2/2018 | Ngampornsukswadi et al. | |
| 2018/0075527 A1 | 3/2018 | Nagla et al. | |
| 2018/0082678 A1 | 3/2018 | Olmstead et al. | |

FOREIGN PATENT DOCUMENTS

| | | |
|---|---|---|
| AU | 2016231624 A1 | 10/2016 |
| AU | 2015327722 A1 | 4/2017 |
| AU | 2015330644 A1 | 4/2017 |
| AU | 2016208989 A1 | 8/2017 |
| AU | 2016224908 A1 | 9/2017 |
| AU | 2016287789 A1 | 2/2018 |
| BR | 112012013891 A2 | 5/2016 |

(56) References Cited

FOREIGN PATENT DOCUMENTS

| | | |
|---|---|---|
| CA | 2707196 A1 | 1/2011 |
| CA | 2927532 A1 | 1/2011 |
| CA | 2927607 A1 | 1/2011 |
| CA | 2681251 A1 | 3/2011 |
| CA | 2706252 A1 | 3/2011 |
| CA | 2777438 A1 | 11/2012 |
| CA | 2871322 A1 | 3/2014 |
| CA | 2830260 A1 | 4/2014 |
| CA | 2844318 A1 | 9/2014 |
| CA | 2961916 A1 | 4/2016 |
| CA | 2963287 A1 | 4/2016 |
| CA | 2913700 A1 | 6/2016 |
| CA | 2916284 A1 | 6/2016 |
| CA | 2970743 A1 | 6/2016 |
| CA | 2974151 A1 | 7/2016 |
| CA | 2922072 A1 | 8/2016 |
| CA | 2978488 A1 | 9/2016 |
| CA | 2980196 A1 | 9/2016 |
| CA | 2991073 A1 | 1/2017 |
| CA | 2910754 A1 | 4/2017 |
| CA | 3000464 A1 | 4/2017 |
| CA | 3000466 A1 | 4/2017 |
| CA | 2952874 A1 | 6/2017 |
| CA | 2970686 A1 | 12/2017 |
| CA | 2976505 A1 | 2/2018 |
| CA | 2976618 A1 | 2/2018 |
| CA | 2963767 A1 | 3/2018 |
| CN | 105978756 A | 9/2016 |
| CN | 107004190 A | 8/2017 |
| CN | 107004195 A | 8/2017 |
| CN | 107408253 A | 11/2017 |
| EP | 2510451 A1 | 10/2012 |
| EP | 3201856 A1 | 8/2017 |
| EP | 3234792 A1 | 10/2017 |
| EP | 3248159 A1 | 11/2017 |
| EP | 3260979 A1 | 12/2017 |
| EP | 3269090 A1 | 1/2018 |
| EP | 3272082 A1 | 1/2018 |
| EP | 3317833 A1 | 5/2018 |
| KR | 20180026498 A | 3/2018 |
| MX | 2012006659 A | 1/2013 |
| MX | 2017011021 A | 1/2018 |
| SG | 10201704581 | 7/2017 |
| SG | 11201501568 S | 8/2017 |
| SG | 11201707004 | 9/2017 |
| WO | WO-2006/039815 | 4/2006 |
| WO | WO-2008/019465 | 2/2008 |
| WO | WO-2011/069234 A1 | 6/2011 |
| WO | WO2014/043420 | 3/2014 |
| WO | WO-2016/049745 A1 | 4/2016 |
| WO | WO-2016/054727 A1 | 4/2016 |
| WO | WO-2016/095012 A1 | 6/2016 |
| WO | WO-2016/115620 A1 | 7/2016 |
| WO | WO-2016/135705 A1 | 9/2016 |
| WO | WO-2016/141491 A1 | 9/2016 |
| WO | WO-2016/149807 A1 | 9/2016 |
| WO | WO-2017/000061 A1 | 1/2017 |
| WO | WO-2017/054094 A1 | 4/2017 |
| WO | WO-2017/054095 A1 | 4/2017 |
| WO | WO-2017/136956 A1 | 8/2017 |
| WO | WO-2017/143435 A1 | 8/2017 |
| WO | WO-2017/152265 A1 | 9/2017 |
| WO | WO-2018/010009 A1 | 1/2018 |
| WO | WO-2018/014123 A1 | 1/2018 |
| WO | WO-2018/049523 A1 | 3/2018 |
| ZA | 2012/05093 B | 2/2014 |

OTHER PUBLICATIONS

The News from Waterloo, archives org webpages, Sep. 12, 2015 https://web.archive.org/web/20150912031729/http://thenewsfromwaterloo.com/pigeon-post.html.*

John Kay, Enduring lessons from the legend of Rothschild's carrier pigeon, Financial Times, May 28, 2013 https://www.ft.com/content/255b75e0-c77d-11e2-be27-00144feab7de.*

Flitter et al, Insight Chicago Fed warned on high-frequency trading, reuters webpages, Sep. 30, 2012 http://www.reuters.com/article/us-markets-tech-breakdowns/insight-chicago-fed-warned-on-high-frequency-trading-idUSBRE88T0NF20121001.*

Young T, How to Regulate a Secret the Clandestine Nature of High-Frequency Trading Makes It Nearly Impossible to Police, Thankfully, a New and Fairer Market Is Emerging, Intl Fin. L Rev, 3334, 2014 http://heinonline.org/HOL/Page?handle=hein.journals/intfinr33&div=83&g_sent=1&casa_token=&collection=journals.*

Bhupathi, Tara, Technology Latest Market Manipulator-High Frequency Trading the Strategies, Tools, Risks, and Responses, NCJL and Tech, 11, 377, 2009 http://scholarship.law.unc.edu/cgi/viewcontent.cgi?article=1168&context=ncjolt.*

International Search Report, PCT/US2015/50708, International Filing Date Dec. 31, 2015.

International Search Report and Written Opinion, PCT/US15/26168, dated Jul. 27, 2015.

Form ATS; OMB No. 3235-0509; Initial Operation Report, Amendment to Initial Operation Report and Cessation of Operations Report for Alternative Trading System, 34 pages.

WSJ, Scott Patterson, Upstart Pitches Trading Sanctum, Jul. 29, 2013 9:00 ET, 2 pages.

Reuters; Sarah N. Lynch, Insight: Chicago Fed warned on high-frequency trading; Sep. 30, 2012 8:05 PM, 14 pages.

Bloomberg, Sam Mamudi, IEX to Reveal Dark Pool Operations Data in Challenge to Peers, Oct. 22, 2013 19:02:46.764 GMT, 2 pages.

"High Frequency traders face speed limits" by Stephen Foley (herein after Foley) Apr. 28, 2013. (Year: 2013).

A Speed Limit for the Stock Market by Roger Lowenstein Oct. 1, 2012 (Year: 2012).

Canadian Grant No. 2871322; Transmission Latency Leveling Apparatuses, Methods and Systems, IEX Group Inc.; Feb. 22, 2018.

Clamping Down on Rapid Trades in Stock Market by Graham Bowley Oct. 8, 2011 (Year: 2011).

Huw Jones—EU lawmaker turns screw on ultra-fast trading Mar. 26, 2012 (Year: 2012).

Int'l Preliminary Report on Patentability in PCT/US2013/059558; dated Mar. 17, 2015; 8 pgs.

Int'l Search Report and Written Opinion of the ISA/US in PCT/US2013/059558; dated Dec. 17, 2013; 4 pgs.

Mark Perl Transmission Basics Jan. 14, 2012 (Year: 2012).

Michael Lewis, Flash Boys: A Wall Street Revolt, New York Times article adapted from book (274 pp. W. W. Norton & Company), http://www.nytimes.com/2014/04/06/magazine/flash-boys-michael-lewis.html.

Notification of Grant; Singapore Patent Application No. 11201501568S; Transmission Latency Leveling Apparatuses, Methods and Systems, IEX Group Inc.; dated Aug. 11, 2017.

Tetsuya Kawanishi, Atsushi Kanno, Yuki Yoshida, Ken-ichi Kitayama, "Impact of wave propagation delay on latency in optical communication systems," Proc. SPIE 8646, Optical Metro Networks and Short-Haul Systems V, 86460C (Feb. 5, 2013) (Year: 2013).

The European Union's Response to the 2007-2009 Financial Crisis Walter W. Eubanks Specialist in Financial Economics (Year: 2010).

Third Party Observation in PCT/US2013/059558, 2 pgs.

Written Opinion in PCT/US2013/059558; dated Dec. 17, 2013; 7 pgs.

Ivy Schmerken, PDQ ATS Launches a New Electronic Equity Auction for Large Orders, 1-4 pages, Sep. 22, 2014, InformationWeek WallStreet & Technology, http://www.pdqats.com/pdq-ats-launches-a-new-electronic-equity-auction-for-large-orders/.†

Dan Marcus, Market structure evolution, 1-6 pages, Mar. 13, 2015, ParFx press release, https://www.parfx.com/news/press-releases/market-structure-evolution-by-dan-marcus-ceo-parfx/.†

Notice of Filing of Proposed Rule Change to Modify Exchange Rule 3307 to Institute a Five Millisecond Delay in the Execution Time of Marketable Orders on NASDAQ OMX PSX, 1-12 pages, Aug. 17, 2012, U.S. Securities and Exchange Commission. File No. SR-Phlx-2012-106 Release No. 34-67680, https://www.sec.gov/rules/sro/phlx/2012/34-67680.pdf.†

(56) References Cited

OTHER PUBLICATIONS

About ParFx, 1-2 pages, Sep. 11, 2013, ParFx Web Site, https://web.archive.org/web/20130911210916/http://www.parfx.com/about-parfx.†

Joe Castaldo, How Aequitas plans to build a kinder, gentler stock market, 1-12 pages, Mar. 26, 2015, Canadian Business http://www.canadianbusiness.com/innovation/aequitas-vs-hft/.†

Greg Klein, HFT speed bump gets green light as OSC approves Aequitas Neo Exchange, 1-2 pages, Nov. 17, 2014, Resource Clips http://resourceclips.com/2014/11/17/hft-speed-bump-gets-green-light-as-osc-approves-aequitas-neo-exchange/.†

Schematic (Auction Process)/PDQ ATS,1 page, Sep. 30, 2015, PDQ Web Site, https://web.archive.org/web/20150930073841/http://www.pdqats.com/platform/process/.†

Ivy Schmerken, EBSs Plan to Slow Down HFT in FX Could Influence Other Regulators, 1-2 pages, Apr. 29, 2013, InformationWeek WallStreet & Technology, http://www.wallstreetandtech.com/exchanges/ebss-plan-to-slow-down-hft-in-fx-could-influence-other-regulators/a/d-id/1268077.†

Application for Recognition of Aequitas Neo Exchange Inc. (Aequitas Neo Exchange) and its parent company, Aequitas Innovations Inc. (Aequitas), of Notice and Request for Comment, 1-41 pages, Jun. 27, 2014, Ontario Securities Commission, https://www.osc.gov.on.ca/documents/en/Marketplaces/xxr-aequitas_20140627_nrfc-application2.pdf.†

Innovative Design to Promote Liquidity Formation, 1-2 pages, Apr. 5, 2015, Aequitas NEO Exchange Web Site, https://web.archive.org/web/20150405131256/https://www.aequitasneoexchange.com/en/trading/trading-solutions/neo-book/.†

TMX Group to Streamline its Equities Trading Offering, 1-2 pages, Oct. 23, 2014, TMX Press Release, https://www.tmx.com/newsroom/press-releases?id=203&year=2014&month=10.†

\* cited by examiner
† cited by third party

SYSTEMS AND METHODS FOR PROVIDING UP-TO-DATE INFORMATION FOR TRANSACTIONS

CROSS-REFERENCE TO RELATED APPLICATIONS

This application claims priority to and the benefit of, and incorporates herein by reference in its entirety, U.S. Provisional Patent Application No. 61/980,421, entitled "IEX True Price Matching Engine," which was filed on Apr. 16, 2014.

FIELD OF THE INVENTION

This disclosure generally relates to systems and methods for receiving and processing data and transaction requests and, in particular, to enabling all transaction requests to have access to up to date information.

BACKGROUND OF THE INVENTION

On a typical electronic venue, participants generally submit requests for transactions in items for interest. Examples of such requests include requests for trading stocks, bids on an article in an auction, requests for trading tickets to sports events, etc. Often, transactions in the items of interest occur at not just one venue but at several different venues. The transaction at one venue can affect the item price at other venues and, as a result, the price of an item of interest at a particular venue is generally affected by transactions at one or more other venues. A typical venue, therefore, receives transaction information or data about various items from several venues and other sources of information. Using the received information/data, the venue may update the price(s) of item(s) of interest. The venue participants usually rely on the venue, e.g., as part of a price matching/guarantee program, in accordance with regulation (such as the trade through prohibition under the U.S. Regulation NMS), etc., to access such information/data and to provide up to date price(s) for the item(s) for transactions in such item(s) that are requested by the venue participants.

Advances in communication and data processing technology have allowed some venue participants to access information affecting item prices from various sources before the venue does. These participants may use that information to compute updated prices of the item(s) of interest, and may send transaction request(s) to the venue, before the venue computes the updated price(s). These transaction requests may be based on the data received by these participants and/or the updated prices computed by such participants. Therefore, in executing transactions, these participants can gain an advantage over other venue participants, who lack knowledge of the latest data and updated item prices because they rely on the venue for that data and prices. In some situations, the other participants may suffer harm such as losing a bid to an item of interest, paying more than necessary for a purchased item, and/or receiving less than full, up to date price for a sold item, etc.

SUMMARY OF THE INVENTION

Various embodiments of the present disclosure allow a venue to compute up to date prices for item(s) of interest when data affecting such prices becomes available, before executing any transaction request(s) that are based at least in part on the knowledge of such data. Therefore, transaction requests from all venue participants may have access to the latest data and the most up to date item prices, and generally no participant has any advantage resulting from the slower data access and processing by the venue relative to that venue participant. This is achieved in part by introducing a predetermined delay when a transaction request is received at the venue, prior to processing the request. The delay is based in part the delay associated with receiving new data at the venue and in part on the delay involved in processing the received data at the venue. As such, transaction requests may be generally delayed by no more than the time it would take the venue to compute the most up to date price(s) of item(s).

Accordingly, in one aspect, a method is provided for facilitating at a computerized venue transactions that are based on up to date item prices. The method includes receiving at the venue, via a communication interface, data q associated with a price of an item. In general, the data q is received after a communication delay of at most v units of time. The method also includes computing by a price computation processor at the venue an up to date price r of the item using the received data q. The computation of the up to date price r is generally associated with a processing delay of at most d units of time after the data q is received, i.e., after the data q is received, it generally takes d units of time for the price computation processor to compute the up to date price r. The method further includes receiving at the venue a first electronic transaction request for the item, and forwarding the first electronic transaction request to a transactions matching processor at the venue after a forwarding delay of p units of time. The forwarding delay is a function of the communication delay and/or the processing delay. As such, the up to date price of the item computed by the price computation processor is accessible to the transactions matching processor before matching the first electronic transaction request with another electronic transaction request.

In some embodiments, the data q associated with the item is received from a particular quotation provider among several quotation providers, and the communication delay depends at least in part on the quotation provider from which the data q is received, and/or a communication infrastructure between the quotation provider and the venue. The item may be a security, an event ticket, a ticket for a service, and/or an article for sale. The security may be a stock, a bond, a currency, a crypto-currency, and/or a derivative instrument. If the item is a security, the up to date price r may include a national best bid and offer (NBBO) price of the security.

In some embodiments, the first electronic transaction request is based at least in part on the data q and/or the up to date price r of the item derived by a sender of the request using the data q. The first electronic transaction request may be received at the venue before computation of the up to date price r of the item is completed by the price computation processor. The first electronic transaction request can be a buy order, a sell order, an order revision, an order cancellation, a bid, an offer, a trading interest, and/or an indication of interest.

In some embodiments, the forwarding delay p is in a range from 300 μs up to 400 μs. For example, the forwarding delay can be 320 μs, 350 μs, 360 μs, etc. The forwarding delay p can also be less than 300 μs, e.g., 200 μs, 120 μs, 80 μs, or less, or can be more than 400 μs. The communication delay may based on, at least in part, one or more characteristics of a communication infrastructure between the venue and a source of the data q. The processing delay may be based on, at least in part, one or more characteristic of the price computation processor. The function of the communication delay and/or the processing delay used in determining the forwarding delay p may include the sum of the communication delay v and the processing delay d or a fraction of the sum.

In some embodiments, the method further includes matching by the transactions matching processor the first electronic transaction request with a second electronic transaction request, where the matching is based on, at least in part, the up to date price r of the item computed by the price computation processor. If the first electronic transaction request includes a sell order the second electronic transaction request may include a buy order and, otherwise, the first electronic transaction request may include a buy order and the second electronic transaction request may include a sell order. The second electronic transaction request may be received prior to receiving the data q at the venue.

In another aspect, a system for facilitating transactions that are based on up to date item prices includes a communication interface for receiving data q associated with a price of an item. In general, the data q is received after a communication delay of at most v units of time. The system also includes a price computation processor for computing an up to date price r of the item using the received data q. The computation of the up to date price r is generally associated with a processing delay of at most d units of time after the data q is received, i.e., after the data q is received, it generally takes d units of time for the price computation processor to compute the up to date price r. The system additionally includes a transaction request delay module that delays a first electronic transaction request for the item by a forwarding delay of p units of time, and forwards the delayed first electronic transaction request to a transactions matching processor. The forwarding delay is a function of the communication delay and/or the processing delay. As such, the up to date price of the item computed by the price computation processor is accessible to the transactions matching processor before matching the first electronic transaction request with another electronic transaction request.

In some embodiments, the data q associated with the item is received from a particular quotation provider among several quotation providers, and the communication delay depends at least in part on the quotation provider from which the data q is received, and/or a communication infrastructure between the quotation provider and the system. The item may be a security, an event ticket, a ticket for a service, and/or an article for sale. The security may be a stock, a bond, a currency, a crypto-currency, and/or a derivative instrument. If the item is a security, the up to date price r may include a national best bid and offer (NBBO) price of the security.

In some embodiments, the first electronic transaction request is based at least in part on the data q and/or the up to date price r of the item derived from the data q by a sender of the first electronic transaction request. The first electronic transaction request may be received at the system/the transaction request delay module before computation of the up to date price r of the item is completed by the price computation processor. The first electronic transaction request can be a buy order, a sell order, an order revision, an order cancellation, a bid, an offer, a trading interest, and/or an indication of interest.

In some embodiments, the forwarding delay p is in a range from 300 µs up to 400 µs. For example, the forwarding delay can be 320 µs, 350 µs, 360 µs, etc. The forwarding delay p can also be less than 300 µs, e.g., 200 µs, 120 µs, 80 µs, or less, or can be more than 400 µs. The communication delay may be based on, at least in part, one or more characteristics of a communication infrastructure between the system/the communication interface and a source of the data q. The processing delay may be based on, at least in part, one or more characteristics of the price computation processor. The function of the communication delay and/or the processing delay that is used in determining the forwarding delay p may include the sum of the communication delay v and the processing delay d or a fraction of the sum.

In some embodiments, the system further includes a transactions matching processor for matching the first electronic transaction request with a second electronic transaction request, where the matching is based on, at least in part, the up to date price r of the item computed by the price computation processor. If the first electronic transaction request includes a sell order the second electronic transaction request may include a buy order and, otherwise, the first electronic transaction request may include a buy order and the second electronic transaction request may include a sell order. The second electronic transaction request may be received by the system prior to receiving the data q at the communication interface.

One technical effect of various embodiments of the present invention is that a venue or platform for electronically executing transactions in items can receive information that can affect item price and can compute updated item prices using the received information before executing any transactions, so that all venue participants who may present the transaction requests can rely on the venue/platform to use the most up to date item prices in executing the transactions. Another technical effect of various embodiments of the present invention is that the delay introduced in order to generally ensure that the venue has computed the up to date item prices before executing any transactions may depend on one or more characteristics of a communication infrastructure and/or one or more characteristics of processing subsystems at the venue, so that the delay in execution of the transactions is generally no more than necessary.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
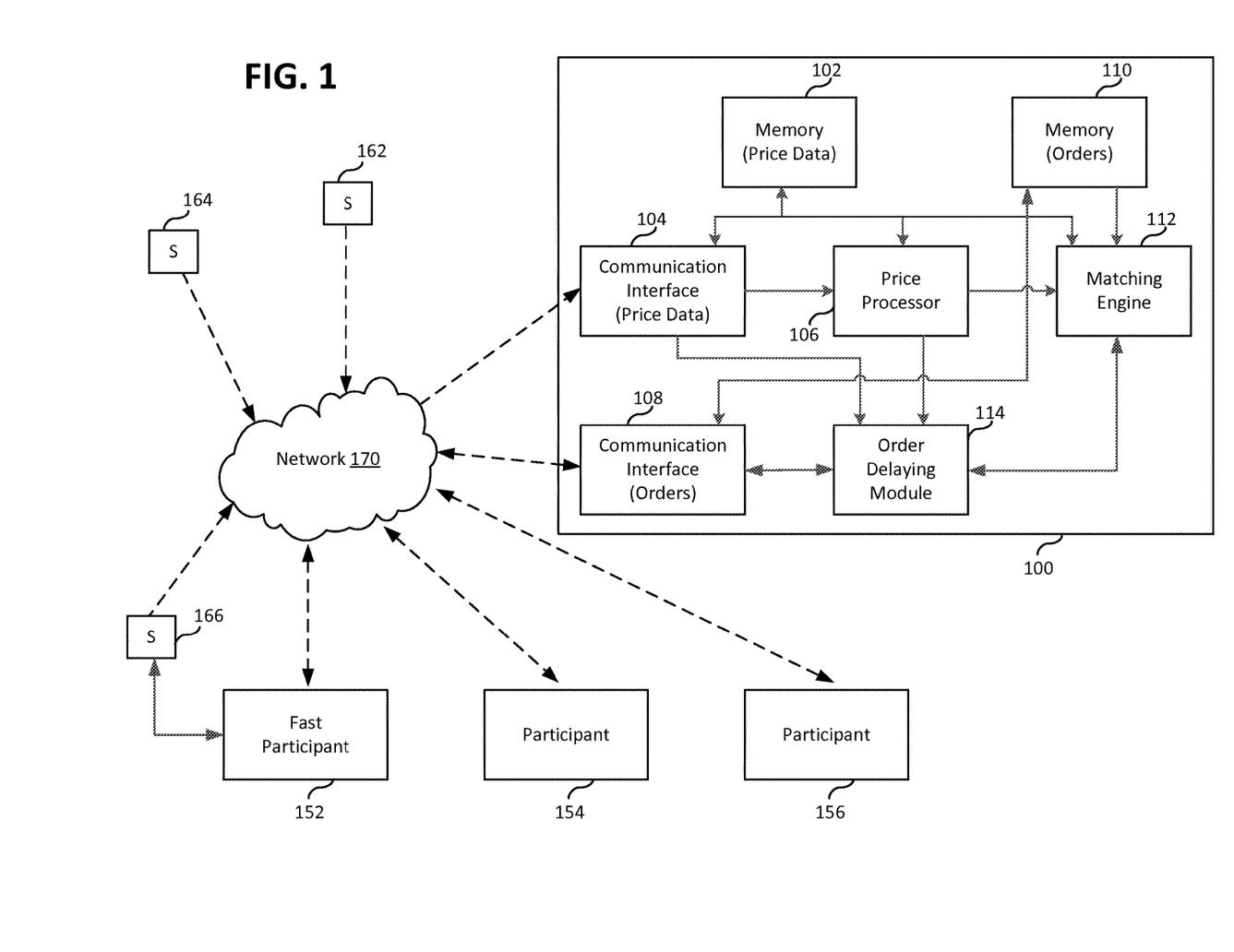
FIG. 1 schematically depicts a true-price platform according to one embodiment, and a typical operating environment of such a platform.

With reference to FIG. 1, a true-price platform 100 (also called a venue) allows various participants 152, 154, 156 to perform transactions relating to one or more items of interest. In some embodiments, the item of interest is a security (e.g., a stock or a bond). In other embodiments, the item of interest can be an event ticket, a ticket for a service, and/or an article for sale. While the description below generally considers a security as the item of interest, this is only for the sake of convenience. The techniques described herein are applicable to various different types of items of interest identified above. It should also be understood that three participants 152, 154, 156 are described for illustrative purposes only. In general, there can be as few as two and more than three, e.g., tens, hundreds, thousands, hundreds of thousands, millions, or even more participants performing transactions relating to one or more items (e.g., tens, hundreds, or thousands of items), of the same or different types.

Typically for a security, at a particular instant of time the platform 100 has a price associated with that security. That price may be stored in a memory module 102. Events, such as trading events associated with the security, can occur at one or more venues 162, 164, 166, which can be trading exchanges; electronic communication networks (ECNs) registered as broker-dealers; alternative trading systems (ATSs) approved by a regulatory agency such as the U.S. Securities and Exchange Commission; private exchanges or forums for trading securities, generally known as dark pools; and/or alternative display facilities (ADF). The number of venues can be any number, e.g., 1, 2, 5, 6, 11, 15, etc. One or more of the events can affect the price of the security. Therefore, the platform 100 may receive data about such events from the one or more sources 162, 164, 166 through a network 170 (e.g., the Internet, a proprietary network, etc.), so that the platform can update the price of the security using the received event data. Data from different sources/venues may be received through different networks and/or networks of different types. Typically, the events continue to occur as time progresses and, hence, the event data may be received by the platform 100, via a communication interface 104, on an on-going basis.

When new data (q) becomes available at a source/venue (e.g., the source 162), that source generally timestamps the data indicating the time at which the data (q) became available, prior to transmission/distribution thereof. That data generally becomes available at the communication interface 104 after a communication delay denoted (v). The communication delay (v) may be caused by a number of parameters such as time for propagation of electrical signals representing the data (q), processing delays introduced by network elements such as buffers, switches, routers, etc. The time of propagation generally depends on the distance between the source and the platform 100. The communication delay (v) is typically on the order of a few hundred microseconds but, as communication technology improves, this delay may decrease to tens of microseconds, and can be on the order of several nanoseconds, or lesser. In some embodiments, the communication interface 104 can compute the communication delay (v) by comparing the time at which the data (q) was received at the interface 104 with the timestamp included in the data (q). In general, different communication delays (v1, v2, v2, etc.) may be associated with different sources 162, 164, 166. The communication delay corresponding to a particular source need not be constant across a number of data transmissions from that source, and may be expressed in terms of statistical parameters such as mean and variance, and/or as a range specified by minimum and maximum values.

After data (q) for a security (an item of interest, in general), is received from a source that data is typically used to update a price of the security. To this end, the communication interface may store the data (q) in the memory module 102 and/or may forward that data to a price processor 106. In some embodiments, the price processor 106 can access the received data from the memory module 102. In various embodiments, the price processor computes an updated price for the security using the received data (q), and may store the updated price in the memory module 102. The computation of the updated price by the price processor 106 may take up to (d) units of time.

In general, the computation of a price can include computation of one or more price-related values such as an instantaneous price, minimum and maximum values of a price range, midpoint price of a range, etc. In different embodiments, the price processors 106 may have different architectures. For example, the price processor 106 may include a single processor or may include several processors performing price-updating computations in sequence and/or in parallel. One or more processors can be general purpose processors and/or specialized processors such as math co-processors. In some embodiments, one or more processors may include application specific integrated circuits (ASICs) and/or field programmable gate arrays (FPGAs). The price processor 106 may be implemented using hardware processors only, using hardware processors having embedded software, or using processors executing software instructions accessed from memory.

Depending on the nature of the computations involved, e.g., whether a single value is to be updated or a number of values are to be updated, and/or the architecture of the price processor 106, the processing delay (d) can change. The processing delay (d) is typically on the order of a few hundred microseconds but, as processing technology improves, this delay may decrease to tens of microseconds, and can be on the order of several nanoseconds, or lesser. The processing delay (d) may also be expressed using statistical parameters such as mean and variance and/or as a range specified by minimum and maximum values. In some embodiments, the price processor 106 is configured to determine the processing delay (d).

In general, after a particular source transmits data (q) related to the price of a security, an updated security price (r) generally becomes available at the platform 100 after the data is received by the communication interface 104 and after the price processor 106 has computed the updated security price (r) based on, at least in part, the received data (q). Therefore, after data (q) is transmitted, the up to date price of the security is generally available at the platform after (p=v+d) units of time. In various embodiments, the price update delay (p) is within the range 300 to 400 μs. As the platform 100 may incorporate improved communication and/or processing technology and/or architecture, the price update delay (p) can decrease. The platform 100 may compute the price update delay (p) using the values of the communication delay (v) and processing delay (d), determined or obtained by the platform 100.

Typically, the participants at a venue such as the platform 100 rely on the platform to receive data affecting prices of a security (an item of interest, in general), and to provide up to date prices for transactions requested by those participants. In some situations, however, one or more participants of a platform have access to the data/information affecting prices of securities independently of the platform. These participants can access such data before the platform does, e.g., by co-locating, decreasing the distance between the source and the participant, using improved communication infrastructure, proprietary networks, etc. Using independently receive data, such participants can also compute the up to date prices faster than the platform, e.g., using faster computing systems. In various embodiments, such participant(s) is/are called fast participant(s) or high frequency traders.

With reference to FIG. 1, the participant 152 is a fast participant. In some situations, the fast participant 152 can generate a transaction request (also called an order) based on the data (q) the fast participant 152 received from a source independently of the platform 100 and/or the up to date price (r) the fast participant 152 computed from the received data. The fast participant 152 may transmit that transaction request to the platform 100 before the platform 100 has computed the up to date price (r) for the security. Such a transaction request and transaction requests from other participants are received at the platform 100 via another communication interface 108. The platform may store these transaction requests in a memory module 110. In some embodiments, a single memory module may be used to store the price related data received from one or more sources, the updated prices, and the transaction requests. In other embodiments, several (e.g., 4, 6, 12, 20, etc.) memory modules may be used to store the price data (q), the updated prices (r), transaction requests received from participant(s), communication delay (v), processing delay (d), and/or any other information used by the communication interfaces 104, 108, the price processor 106, and/or other components of the platform 100. In some embodiments, a single communication interface may receive both the price related data (q) and transaction request(s) from participants.

In general, a matching engine 112, implemented using one or more processors and/or software, matches a transaction request received from one participant with one or more transaction requests that were previously received from one or more other participants. Such previously received transaction requests may be called orders resting on the order book or resting orders, and may be stored in the memory module 110. An order resting on the order book may rely on the platform 100 to provide the up to date price of a security and, as such, if an order based on the most up to date price is received from a fast participant before the platform has computed the most up to date price, the matching engine 112 may match the order using stale price information, giving the fast participant an undue advantage.

To illustrate, consider a SELL order from the participant 156, that is resting on the order book of the platform 100 and asks the platform to sell a specified number of shares of XYZ stock at the midpoint of low and high prices of the XYZ stock. Assume that the current low and high prices of the XYZ stock are L1 and H1, respectively, and that the corresponding midpoint is M1. Also assume that new information about the XYZ stock was received from the source 166 by both the platform 100 and the fast participant 152. Further assume that based on this new information, that the low price L1 increased to L2 and, correspondingly, the midpoint price increased from M1 to M2. As described above, the fast participant 152 may compute M2 and may send a BUY order to buy shares of the XYZ stock at a price M− that is greater than or equal to M1 but less than M2. Thus, the BUY order price M− is less than the true or the most up to date midpoint price M2 of the XYZ stock. As described above, in some instances, the order from the fast participant 152 is received by the platform 100 before the price processor 106 has computed the updated prices L2 and M2.

Such an order can match with the resting order based on the stale midpoint price of M1, so that the participant 156 would sell the specified number of shares of the XYZ stock to the fast participant 152 at the price M−, which is greater than or equal to M1 but is less than M2. As the true or the most up to date midpoint price of the XYZ stock is M2, however, the fast participant 152 can profit from the difference between M2 and M−, the price at which a transaction between the fast participant 152 and the other participant 156 occurred, e.g., by reselling acquired shares of the XYZ stock at the true, up to date price M2 at a profit of (M2−M−) per share. Had the platform 100 computed the prices L2 and M2 before attempting to match the BUY order from the fast participant 152 with any resting SELL orders, the platform 100 would not have caused the participant 156 to sell the shares of the XYZ stock to the fast participant 152 at the price of M− per share. Instead, should a different BUY order relying on the platform 100 to compute the up to date price be received or were resting, the platform 100 would permit the participant 156 to sell the shares of the XYZ stock at the higher, true price M2.

While it may be beneficial to use the fastest available communication and processing systems, this can be impractical, e.g., due to excessive cost and/or may be ineffective, e.g., due to geographic distances between various sources of information and the platform 100. To prevent matching a transaction request based on the latest security-related information with a transaction request based on a stale price of the security, or to minimize the risk of permitting such a match, the platform 100 uses an order delaying module 114 that delays the transaction requests received by the communication interface 108 before they are forwarded to the matching engine 112 for matching. The forwarding delay may be introduced using a buffer implemented in hardware and/or software. The introduced forwarding delay (also denoted p) is related to the communication delay (v) and the processing delay (d) that is determined or obtained by the platform 100, as described above. For example, the forwarding delay introduced can be (p=v+d) units of time, or (p=v+d+1) units of time.

By introducing this forwarding delay, the platform 100 can ensure, or at least increase the likelihood, that the price processor 106 has determined the true, up to date price (r) of a security based on the latest information/data (q) about the security, so that the matching engine 112 has knowledge of the up to date price (r) when it attempts to match transaction requests. One or more of these requests may be received in response to and based on the latest information/data (q) about the security, and one or more requests may rely on the platform to use the latest information/data (q) and the up to date price (r). By delaying the requests, the platform 100 can make the up to date price of securities (items of interest, in general) available to all participants prior to matching their transaction requests, thereby reducing the likelihood that a fast participant can take an undue advantage of other participants.

While introducing a forwarding delay as describe above can alleviate or at least mitigate the problem of undue advantage to the fast participant(s), introducing such a delay in general may slow down the overall processing at the platform 100. This can result in a disadvantage to all participants at the platform 100 because transactions at other venues (e.g., the venues 162, 164, 166) may be performed relatively faster than at the platform 100. Therefore, in various embodiments, the forwarding delay introduce by order delaying module 114 is minimal. As used herein, minimal delay means a delay based on the communication delay (v) and the processing delay (d) as determined or obtained by the platform 100. The determination of one or more delays can be performed via computations at the communication interface 104, the price processor 106, and/or another processor of the platform 100, as described above. Additionally or in the alternative, communication and/or processing delays may be estimated using information about the communication and/or processing systems, and may be computed by the platform 100 or may be supplied thereto.

If the communication interface 104 and/or the price processor 106 are improved using faster networks, processors, and other components that exist at present and/or as such components would become available in the future, the computed and/or estimated delays (v, d), respectively, can account for these improvements, resulting reductions in either or both of these delays. Therefore, in some embodiments, the forwarding delay (p) that is introduced by the order delaying module 114 is adaptive to the components of the platform 100, and is no more than the least amount of time required to ensure that the price processor 106 has computed the up to date price (r) of a security before the matching engine 112 matches any transaction requests for that security.

In some embodiments, if the communication and processing delays (v, d), respectively, are represented by the respective worst-case estimates, the introduced forwarding delay (p) can be a fraction of the sum (v+d), e.g., 30%, 50%, 60%, or 75%, etc. The fraction may be selected according to the statistical parameters of the communication and processing delays (v, d), respectively. As such, the likelihood that a fast participant can take an undue advantage of other participants at the platform 100 can be minimized while also minimizing the likelihood that the platform 100 is significantly slower relative to other exchanges/venues where transactions in the security (item of interest, in general) can take place. As used herein, significantly slower means, e.g., slower by 5%, 2%, 1%, 0.5%, 0.01%, or even less.

In various embodiments, an item of interest can be a security such as a stock, bond, a currency, a crypto-currency, and/or a derivative instrument such as an option. The item of interest can also be an event ticket such as a concert ticket or a sports event ticket, a ticket for a service such as an airline or cruise ticket. The item can also be an article for sale, such as a wearable device, a painting, etc., at an online trading venue such as eBay™, or an indication of interest. If the item of interest is a security, the sources of information 162, 164, 166 can be security trading venues such as exchanges; electronic communication networks (ECNs) registered as broker-dealers; alternative trading systems (ATSs) approved by a regulatory agency such as the U.S. Securities and Exchange Commission; private exchanges or forums for trading securities, generally known as dark pools; and alternative display facilities (ADFs). The platform 100 can also be any type of security trading venue described above.

These venues typically generate market data that can affect the price of the securities traded at these venues. A securities information processor (SIP) may also provide market data. As such, the platform 100 and other entities including brokers, trading firms, and investors, generally consume market data generated at one or more venues including SIPs. These entities can also be the participants at the platform 100, such as the participants 152, 154, 156. In one embodiment, the platform 100 is configured to consume data from eleven different trading venues. Such data can be received via different types of communication infrastructures such as ticker tape, a communication network such as the Internet, and proprietary networks often called Direct Feed networks, at varying speeds. Additional examples of communication infrastructure that the platform 100 and/or a fast participant may employ also include binary communication protocols, 40 Gb Ethernet, and microwave communication. In some embodiments, the platform 100 may receive market data via more than one communication infrastructures, e.g., for redundancy.

The introduction of the forwarding delay (p) can be particularly effective when the data affecting the price of a security (item of interest, in general) is changing frequently, such as several times in a few seconds, or in one second or fraction thereof. In some embodiments, the true or up to date price is represented as the National Best Bid and Offer (NBBO), and the platform 100 can compute the NBBO for a security in less than 350 μs and, accordingly, the forwarding delay introduced by the order delaying module 114 is 350 μs. An order in general, may include a buy order, a sell order, an order revision, an order cancellation, a bid, an offer, a trading interest, and/or in indication of interest.

Example: Resting Buy Order:

The NBBO is currently 30.00×30.05, and the NBBO updates to 29.95×30.00, i.e., the up to date price (r) is 29.95×30.00. An investor, i.e., a participant, has a non-displayed order resting on the order book to Buy 10,000 XYZ @ 30.04. A venue that is slower to process received data and to update the price of the XYZ stock than some of its own participants may allow a fast participant to execute a Sell order against the resting Buy order at the stale price of $30.04, a price $0.04 outside the National Best Offer price, costing the buyer an extra $400. The platform 100, however, will determine the updated NBBO before the Sell order is matched by the matching engine 112 and, thus, will not allow the Buy order to execute at a price above $30.00, i.e., the most up-to-date National Best Offer price.

Example: Midpoint Peg Order:

The NBBO is currently 10.00×10.04 with a midpoint price of 10.02. An investor has an order resting on the order book: SELL 10,000 XYZ @ MIDPOINT PEG, which is determined to be 10.02. The NBBO updates to 10.03×10.04 with a new midpoint price of 10.035. A venue that is slower to process received data and to update the price of the XYZ stock than some of its own participants may allow a fast participant to execute a Buy order against the Midpoint Peg Sell order at the stale midpoint price of $10.02, a price $0.01 outside the National Best Bid price and $0.015 worse than the new midpoint price. The platform 100, however, will determine the updated NBBO before the Buy order is matched by the matching engine 112 and, thus, will only allow the Midpoint Peg Sell order to execute at $10.035, the most up-to-date and accurate midpoint price.

Figure 2A:
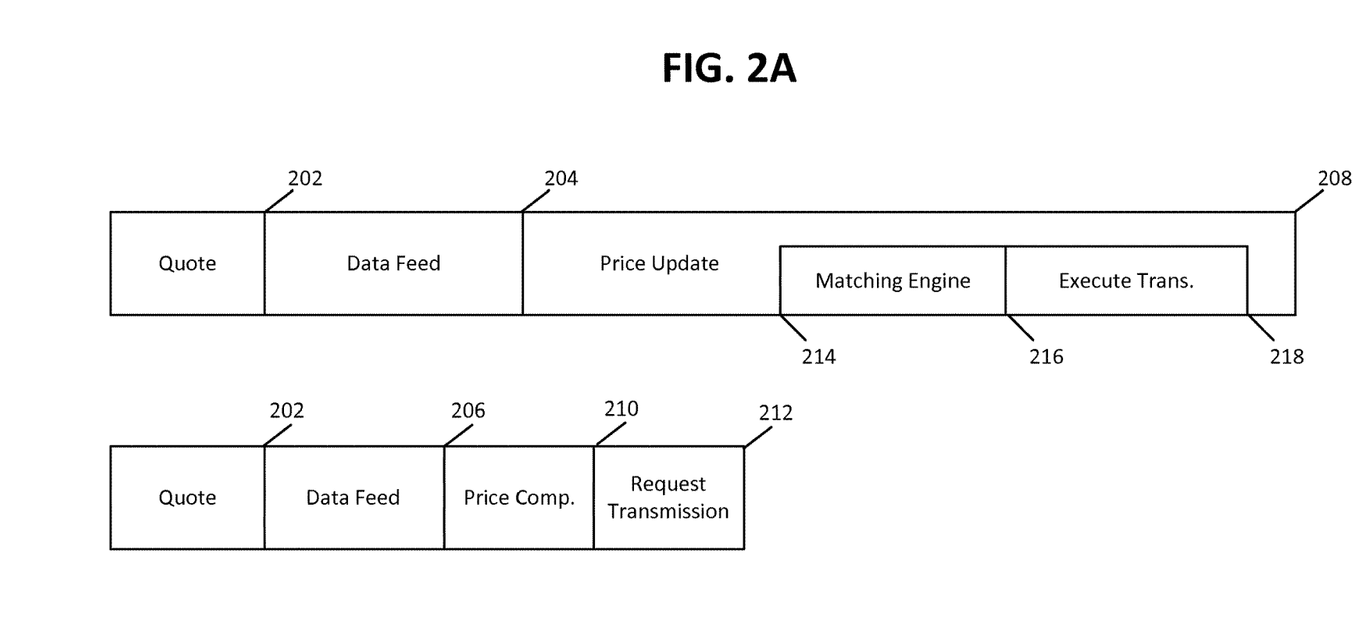
FIG. 2A depicts a time sequence of events associated with a conventional venue.

With reference to FIG. 2A, a quotation change may occur, i.e., new data (q) affecting the price of an item of interest may become available at time instant 202. The data (q) may be received via a data feed at a conventional venue at time instant 204. The same data (q) may be received at a fast participant before the time instant 204, at time instant 206. Using the data (q) the conventional venue may compute an up to date price (r) at time instant 208. Prior to that, the fast participant may compute the up to date price (r) at time instant 210 and may transmit a transaction request based on the data (q) and/or the price (r) to the conventional venue at time instant 212. Upon receiving that request at time instant 214, the conventional venue may match the transaction request with a previously received request from another participant, at time instant 216, before the conventional venue has computed the up to date price (r). The transaction may be processed at time instant 218, giving an advantage to the fast participant.

Figure 2B:
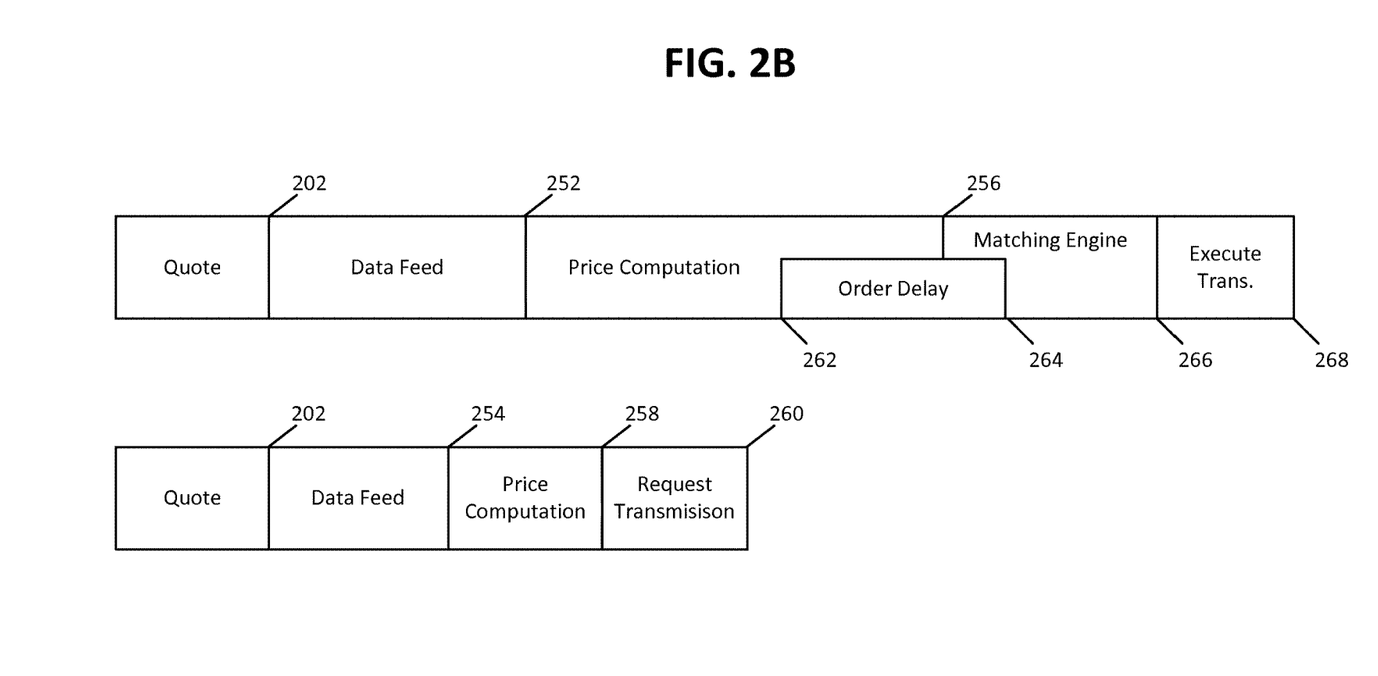
FIG. 2B depicts a corresponding time sequence associated with a venue delaying transaction requests, according to one embodiment.

With reference to FIG. 2B, after the data (q) becomes available at the time instant 202, the data is received at a venue configured to introduce a forwarding delay, at time instant 252, and at a fast participant, at an earlier time instant 254. The delay introducing venue may compute the up to date price (r) that is based on the data (q) at time instant 256. Prior to that, the fast participant may compute the up to date price (r) at time instant 258 and may transmit a transaction request based on the data (q) and/or the price (r) to the delay introducing venue at time instant 260. After receiving the transaction request at time 262, the delay introducing venue would delay the transaction request by a delay (p), and the matching engine would not begin to match the request until time instant 264, which is later than the time instant 256, so that the matching engine has knowledge of the most up to date price (r). The matching engine may match the request with that from another participant at time 266, and the transaction may be processed at time instant 268, so that the other participant, who may rely on the venue to access the latest information/data (q) relating to item(s) of interest and to compute up to date price(s) (r) for such item(s), is not at a disadvantage.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for a computerized trading venue to process transactions after up to date item prices are determined by the trading venue in order to deter or mitigate high frequency trading or fast trading, the method comprising steps of:
   (a) receiving at the trading venue, via a communication interface coupled to a computer network, from a specific first pricing source among a plurality of different pricing sources remotely located from and accessible by the trading venue, first data associated with a price of an item,
   wherein the first data is received at the trading venue after a communication delay from the specific first pricing source to the trading venue caused by at least (1) communications infrastructure between the trading venue and the specific first pricing source and (2) propagation of electrical signals of the first data traveling a distance between the specific first pricing source and the trading venue;
   (b) determining, by the trading venue, a value for the communication delay from the specific first pricing source by one or more of:
      (1) comparing a timestamp included in the transmitted first data to a time at which the first data was received at the trading venue;
      (2) applying a mean and variance for the first data transmitted from the specific first pricing source to the trading venue;
      (3) applying a range specified by minimum and maximum values; or
      (4) applying an estimated value for the communication delay for the first data transmitted from the specific first pricing source to the trading venue;
   (c) determining a processing delay value for the trading venue to compute an up to date price for the item upon receiving new pricing data from a remote source, wherein the processing delay is based on a characteristic of a price computation processor at the trading venue;
   (d) computing by the price computation processor at the trading venue, the price computation processor comprising one or more hardware processors, an up to date price of the item using the received pricing data;
   (e) receiving at the trading venue a first electronic transaction request for the item;
   (f) dynamically determining at the trading venue a forwarding delay value to be applied to the first electronic transaction request based on the specific first pricing source,
   wherein the forwarding delay is based on the determined value for the communication delay and the determined value for processing delay, and
   wherein the forwarding delay is specific to the specific first pricing source such that different values of forwarding delay are determined for different ones of said plurality of pricing sources supplying price update data to the trading venue; and
   (g) forwarding, using a network buffer at the trading venue implemented in hardware or software, the first electronic transaction request to a transactions matching processor upon applying the determined forwarding delay,
   so that the up to date price of the item computed by the price computation processor is accessible to the transactions matching processor before matching the first electronic transaction request with another electronic transaction request.

2. The method of claim 1, wherein the item comprises a security, an event ticket, a ticket for a service, or an article for sale.

3. The method of claim 2, wherein the item is the security comprising a stock, a bond, a currency, a crypto-currency, or a derivative instrument.

4. The method of claim 2, wherein the up to date price comprises a national best bid and offer (NBBO) price of the security.

5. The method of claim 1, wherein:
   the first electronic transaction request is based on the first data or the up to date price of the item derived from the first data; and
   the first electronic transaction request is received at the venue before computation of the up to date price of the item is completed by the price computation processor.

6. The method of claim 1, wherein the first electronic transaction request comprises a buy order, a sell order, an order revision, an order cancellation, a bid, an offer, a trading interest, or an indication of interest.

7. The method of claim 1, wherein the forwarding delay value is in a range from 300 microseconds up to 400 microseconds.

8. The method of claim 1, wherein the determined forwarding delay value comprises a sum of the communication delay value and the processing delay value.

9. The method of claim 1, wherein the determined forwarding delay value comprises a fraction of a sum of the communication delay value and the processing delay value.

10. The method of claim 1, further comprising matching by the transactions matching processor the first electronic transaction request with a second electronic transaction request, the matching being based on, at least in part, the up to date price of the item computed by the price computation processor.

11. The method of claim 10, wherein:
   when the first electronic transaction request comprises a sell order then the second electronic transaction request comprises a buy order; and
   when the first electronic transaction request comprises a buy order then the second electronic transaction request comprises a sell order.

12. The method of claim 10, wherein the second electronic transaction request was received prior to receiving the first data at the venue.

13. A system for a computerized trading venue to process transactions after up to date item prices are determined by the trading venue in order to deter or mitigate high frequency trading or fast trading, the system comprising:
   (a) a first communication interface coupled to a hardware computer network configured to receive at the trading venue from a specific first pricing source among a plurality of different pricing sources remotely located from and accessible by the trading venue, first data associated with a price of an item;
   wherein the first data is received at the trading venue after a communication delay from the specific first pricing source to the trading venue caused by at least (1) communications infrastructure between the trading venue and the specific first pricing source and (2) propagation of electrical signals of the first data traveling a distance between the specific first pricing source and the trading venue;
   (b) at least one hardware processor at the trading venue configured to:
      (1) determine a value for the communication delay from the specific first pricing source by one or more of: (i) comparing a timestamp included in the transmitted first data to a time at which the first data was received at the trading venue; (ii) applying a mean and variance for the first data transmitted from the specific first pricing source to the trading venue; (iii) applying a range specified by minimum and maximum values; or (iv) applying an estimated value for the communication delay for the first data transmitted from the specific first pricing source to the trading venue; and (2) determine a processing delay value for the trading venue to compute an up to date price for the item upon receiving new pricing data from a remote source, wherein the processing delay is based on a characteristic of a price computation processor at the trading venue;

(3) compute an up to date price of the item using the received pricing data;

(4) receive a first electronic transaction request;

(5) dynamically determine at the trading venue a forwarding delay value to be applied to the first electronic transaction request based on the specific first pricing source, wherein the forwarding delay is based on the determined value for the communication delay and the determined value for processing delay, and wherein the forwarding delay is specific to the specific first pricing source such that different values of forwarding delay are determined for different ones of said plurality of pricing sources supplying price update data to the trading venue; and (c) a network buffer at the trading venue implemented in hardware configured to forward the first electronic transaction request to a transactions matching processor upon applying the determined forwarding delay, so that the up to date price of the item computed by the price computation processor is accessible to the transactions matching processor before matching the first electronic transaction request with another electronic transaction request.

14. The system of claim 13, wherein the item comprises a security, an event ticket, a ticket for a service, or an article for sale.

15. The system of claim 13, wherein:
the first electronic transaction request is based on the first data or the up to date price of the item derived from the first data; and
the first electronic transaction request is received at the venue before computation of the up to date price of the item is completed by the price computation processor.

16. The system of claim 13, wherein the forwarding delay value is in a range from 300 microseconds up to 400 microseconds.

17. The system of claim 13, wherein the determined forwarding delay value comprises a sum of the communication delay value and the processing delay value.

18. The system of claim 13, wherein the determined forwarding delay value comprises a fraction of a sum of the communication delay value and the processing delay value.

19. The system of claim 13, further comprising the transactions matching hardware processor configured to match the first electronic transaction request with a second electronic transaction request, the matching being based on, at least in part, the up to date price of the item computed by the price computation processor.

20. The system of claim 19, wherein:
when the first electronic transaction request comprises a sell order then the second electronic transaction request comprises a buy order; and
when the first electronic transaction request comprises a buy order then the second electronic transaction request comprises a sell order.

* * * * *